US007447890B2

(12) United States Patent
Lee et al.

(10) Patent No.: US 7,447,890 B2
(45) Date of Patent: Nov. 4, 2008

(54) METHOD FOR FAST ACTIVATION AND PLAYING OF MULTIMEDIA DATA WITH NON-FIXED DATA STORAGE MEDIA

(75) Inventors: Chien-Chung Lee, Dasi Township, Taoyuan County (TW); Juyang Chang, Dali (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 319 days.

(21) Appl. No.: 11/114,041

(22) Filed: Apr. 26, 2005

(65) Prior Publication Data

US 2006/0026612 A1 Feb. 2, 2006

(30) Foreign Application Priority Data

Jul. 16, 2004 (TW) .............................. 93121291 A

(51) Int. Cl.
G06F 15/177 (2006.01)
(52) U.S. Cl. .................. 713/1; 713/2; 713/100
(58) Field of Classification Search ...... 713/1, 713/2, 100
See application file for complete search history.

(56) References Cited

U.S. PATENT DOCUMENTS

| | | | | |
|---|---|---|---|---|
| 5,291,595 | A * | 3/1994 | Martins | 707/200 |
| 6,006,285 | A * | 12/1999 | Jacobs et al. | 710/14 |
| 6,226,237 | B1 * | 5/2001 | Chan et al. | 710/14 |
| 6,349,386 | B1 * | 2/2002 | Chan | 713/323 |
| 6,763,458 | B1 | 7/2004 | Watanabe et al. | |
| 6,865,621 | B2 * | 3/2005 | Iwata | 710/20 |
| 6,993,643 | B2 * | 1/2006 | Powell | 713/1 |
| 7,024,493 | B1 * | 4/2006 | Tran | 710/1 |
| 7,096,309 | B2 * | 8/2006 | Ginosar | 710/316 |
| 7,124,290 | B2 * | 10/2006 | Larvoire et al. | 713/1 |
| 7,130,994 | B2 * | 10/2006 | Lin et al. | 713/1 |
| 7,181,738 | B2 * | 2/2007 | Chan | 717/175 |
| 7,228,408 | B2 * | 6/2007 | Wu et al. | 713/1 |
| 2004/0073783 | A1 * | 4/2004 | Ritchie | 713/1 |
| 2004/0128492 | A1 * | 7/2004 | Wang | 713/1 |
| 2005/0210228 | A1 * | 9/2005 | Miller et al. | 713/1 |
| 2006/0259642 | A1 * | 11/2006 | Du et al. | 709/247 |

FOREIGN PATENT DOCUMENTS

| | | |
|---|---|---|
| CN | 1381790 | 11/2002 |
| CN | 1264094 | 4/2003 |

(Continued)

OTHER PUBLICATIONS

Unix Magazine, vol. 14, No. 9; Sep. 1, 1999; pp. 27-29. (translation of previously submitted reference C1).

*Primary Examiner*—Nitin C Patel
(74) *Attorney, Agent, or Firm*—Rosenberg, Klein & Lee

(57) ABSTRACT

A method for fast activation and playing of multimedia data with a non-fixed data storage media, such as compact disk, is provided. The storage media, pre-installed with an operating system, is used to activate the computer. Then the media player connected to the computer is detected, and a device driver for the detected media player and a corresponding media playing application in the storage media are executed. The process further includes establishing a RAM disk area in the RAM of the computer for the space required by executing the operating system, device driver for the media player, and the media playing application programs.

8 Claims, 4 Drawing Sheets

FOREIGN PATENT DOCUMENTS

| | | |
|---|---|---|
| CN | 1437106 | 8/2003 |
| JP | 10-21084 | 1/1998 |
| JP | 10-40110 | 2/1998 |
| JP | 2000-99338 | 4/2000 |
| JP | 2000-235482 | 8/2000 |
| JP | 2001-34480 | 2/2001 |

* cited by examiner

METHOD FOR FAST ACTIVATION AND PLAYING OF MULTIMEDIA DATA WITH NON-FIXED DATA STORAGE MEDIA

FIELD OF THE INVENTION

The present invention relates to a method for computer system activation and playing of multimedia data and, more particularly, to a method for fast activation and playing of multimedia data with a non-fixed data storage media, such as compact disc (CD).

BACKGROUND OF THE INVENTION

As the development in computer technology progresses, the multimedia audiovisual system consisting of a computer and a media player is widely used in offices, households and other business venues. The conventional multimedia systems are mostly designed in the manner that the media player is connected to a computer through a computer interface. Therefore, a user must activate the application program on the media player through the computer to play the multimedia data.

FIG. 1 of the attached drawings shows a schematic view of a conventional multimedia system including a computer and a media player. A computer 100 includes a central processing unit (CPU) 1, a random access memory (RAM) 2, a monitor 3, a basic input/output system (BIOS) read-only memory (ROM) 4, an input/output (I/O) device 5, a fixed data storage device or hard disk 6, a storage media reading device 7 (such as a CD player), a media player 8, a system bus 10, a bus bridge 11, a PCI/ISA bus 12, a monitor interface 30, an I/O control interface 50, a hard disk interface 60, a storage media interface 70, and an audiovisual interface 80. A BIOS program 41 required for activating the computer 100 and a power-on-self-test (POST) program 42 are stored in the BIOS ROM 4.

In the conventional design, to play multimedia data, the user must activate the computer first. After a series of activation processes of the computer are done, the user can start to activate the function of audiovisual playing. This is inconvenient to the user.

Some improvements have been developed to overcome the aforementioned inconvenience. The majority of the proposed solutions include a mechanism to format a first partition area 6a and a second partition area 6b in the hard disk 6 of the computer 100. The first partition area 6a stores a first operating system 61 (such as Microsoft Windows), and the second partition area 6b stores a second operating system 62 (such as Linux-based OS) and various multimedia playing application programs 63 (such as applications for playing MP3, DVD, CD, FM, and TV). The BIOS system of the computer 100 is also modified correspondingly.

With such improvements in place, the user can use a switch or a remote control to determine whether to activate the system in PC mode, or AV mode, or directly press the multimedia play power switch. In the latter case, when the computer is activated, the computer 100 does not execute the activation process of the first operating system 61 in the first partition area 6a. Instead, the computer 100 loads and executes the second operating system 62 in the second partition area 6b, driving only the necessary audiovisual device, and selecting the appropriate playing function to play, such as DVD. In other words, the user does not require to enter the Windows operating system, and the tedious initialization and activation of other hardware of the computer system can be avoided.

However, the aforementioned solutions, although able to fast activate and execution playing multimedia data, requires a specific formation of the hard disk to include a partition area to store a different operating system and a plurality of multimedia application programs. In addition, it is also necessary to modify the BIOS system of the computer, which complicates the hard disk formatting and the modified BIOS system can only be used for specific devices and products, instead of other computers.

Furthermore, the aforementioned solution requires formatting a separate partition area in the hard disk to store programs and information for activation applications. The partition area cannot be accessed or modified by the user. This not only wastes storage space in the hard disk, but also limits the use of the hard disk.

It is, therefore, imperative to develop a method for fast activation and playing of multimedia data without the complication and constrain of the conventional solutions.

SUMMARY OF THE INVENTION

The present invention is aimed to overcome the aforementioned drawbacks of the conventional solutions. A primary objective of the present invention is to provide a method for fast activation and playing multimedia data with non-fixed data storage media for solving the problem that a specific reformatting of the hard disk and modification of BIOS system are not applicable to general computers.

Another objective of the present invention is to provide a method for fast activation and playing multimedia data without occupying a large amount of hardware resources of the computer to overcome the problem that the playing of multimedia data occupies a large amount of hardware resources of the computer.

Yet another objective of the present invention is to provide a method for fast activation and playing of multimedia data without activating a general operating system to save the time for tedious activation and initialization incurred in operation system activation.

The present invention achieves the objectives by providing a non-fixed data storage media, such as compact disk, to be used in activating the computer. The storage media is pre-installed with an operating system to activate the computer. Then the media player connected to the computer is detected, and the driver for the detected player and the corresponding application in the storage media are executed. Therefore, the activation and playing of the multimedia data can be executed without much delay. The method further includes a step of establishing a RAM disk area in the RAM of the computer for the space required by executing the operating system, driver for media player, and media playing application programs.

The present invention, in comparison with the conventional techniques, neither requires to modify the BIOS system nor formatting a specific area in the hard disk drive. The present invention requires only a storage media pre-installed with an operating system and application program to achieve the fast activation and playing of the multimedia data. During the playing of the multimedia data, the operating system and application programs are all stored in the storage media, and, therefore, it uses only minimal hardware resources, and neither requires to activate the operating system in the computer, nor the use of the hard disk drive. This allows the user to fully utilize the hardware resources of the computer and a non-segmented hard disk space.

These and other objects, features, and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

Figure 1:
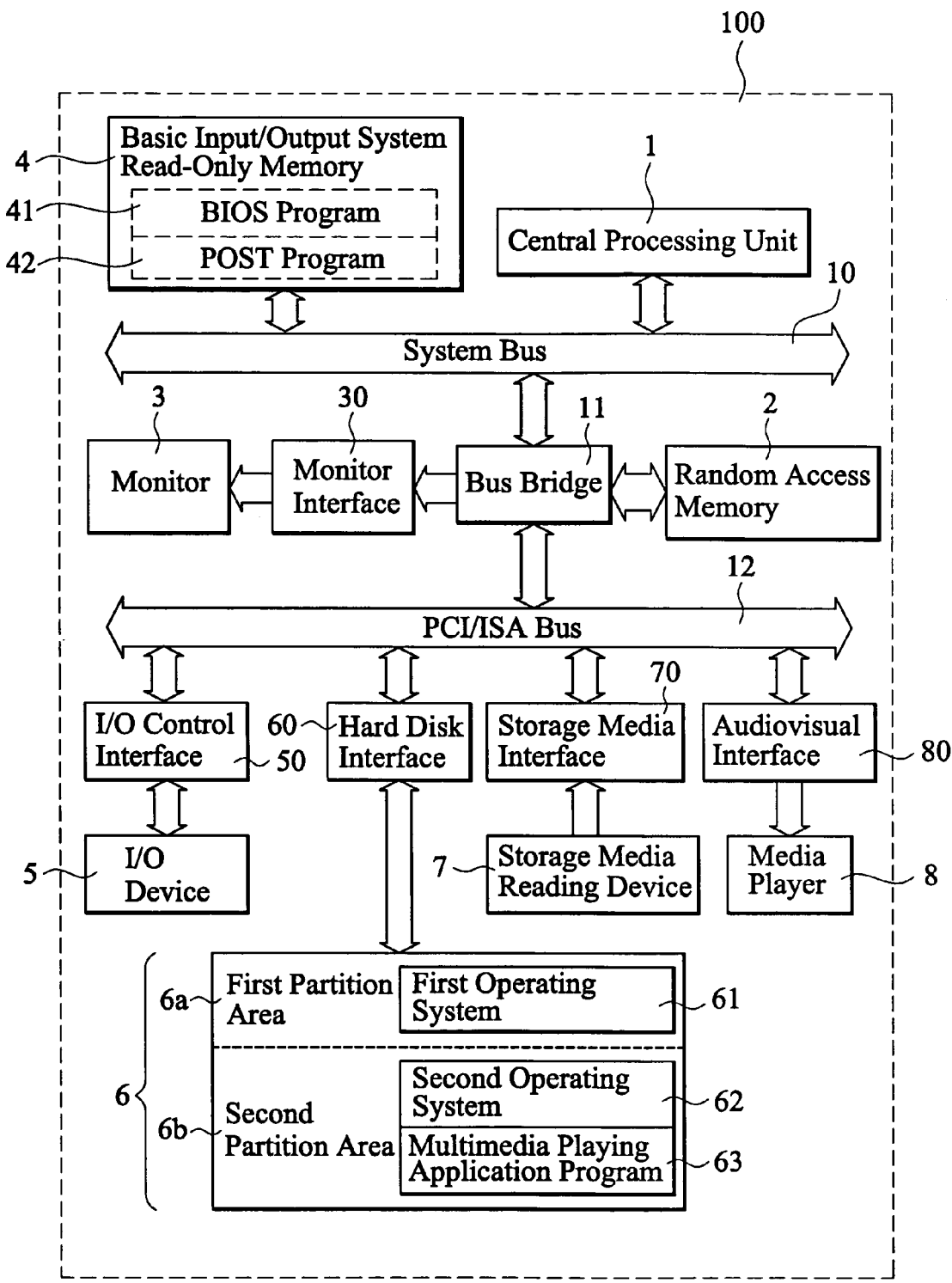
FIG. 1 is a schematic view of a conventional multimedia system including a computer and a media player.
Figure 2:
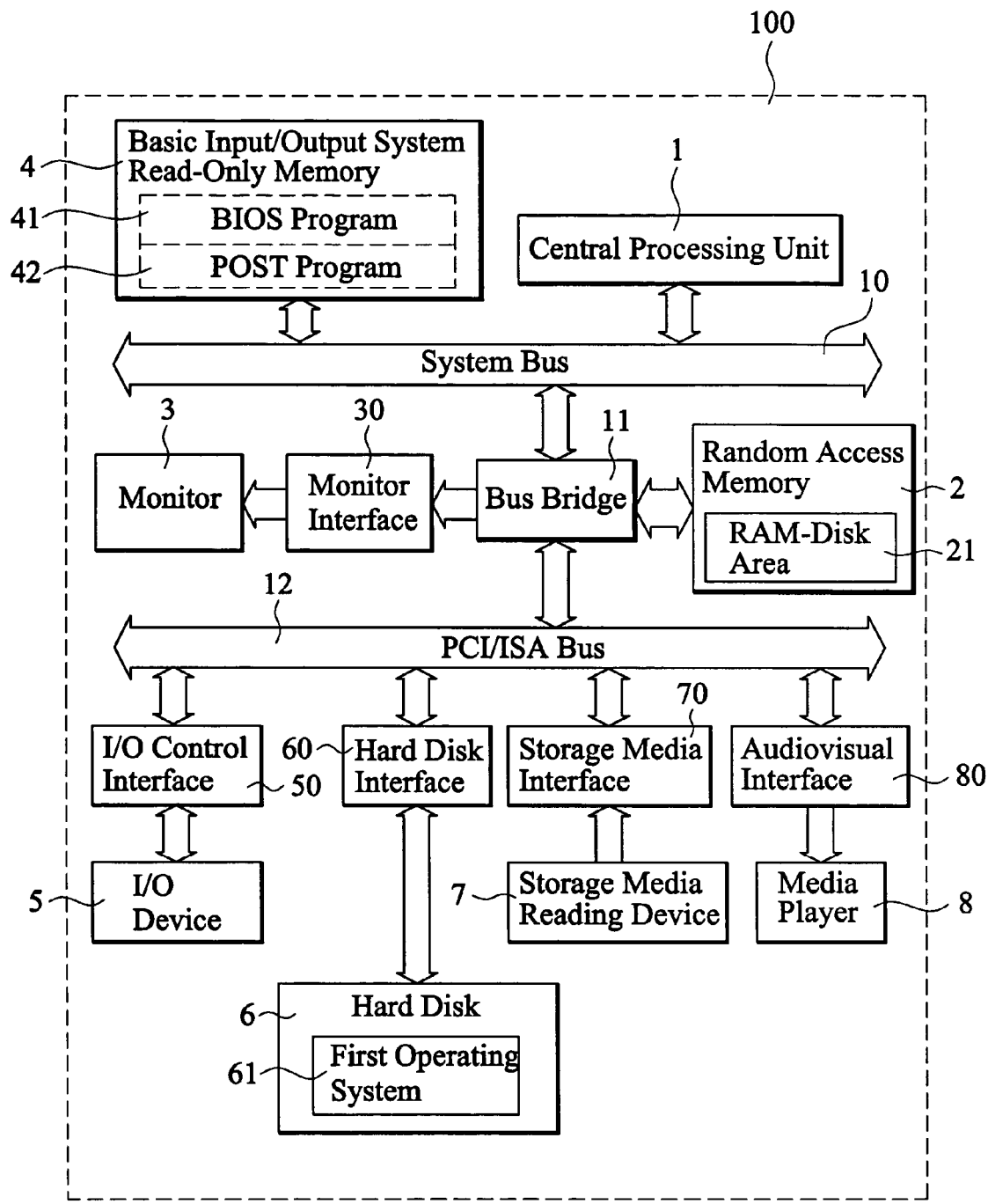
FIG. 2 is a schematic view of a multimedia system with a method for fast activation and playing of multimedia data according to the present invention.

With reference to the drawings and in particular to FIG. 2, which shows a schematic view of a multimedia system with a method for fast activation and playing of multimedia data according to the present invention, a computer 100 includes a CPU 1, a RAM 2, a monitor 3, a BIOS ROM 4, an I/O device 5, a hard disk 6, a storage media reading device 7, a media player 8, a system bus 10, a bus bridge 11, a PCI/ISA bus 12, a monitor interface 30, an I/O control interface 50, a hard disk interface 60, a storage media interface 70, and an audiovisual interface 80. A BIOS program 41 required for activating the computer 100 and a power-on-self-test (POST) program 42 are stored in the BIOS ROM 4.

A first operating system 61 (such as Microsoft Windows) is installed in the hard disk 6. When the computer 100 is activated with the first operating system 61, the computer 100 operates under the first operating system 61. The hard disk 6 is also installed with all the drivers and applications required by the computer 100 to manage the connected devices, such as all the I/O devices.

Figure 3:
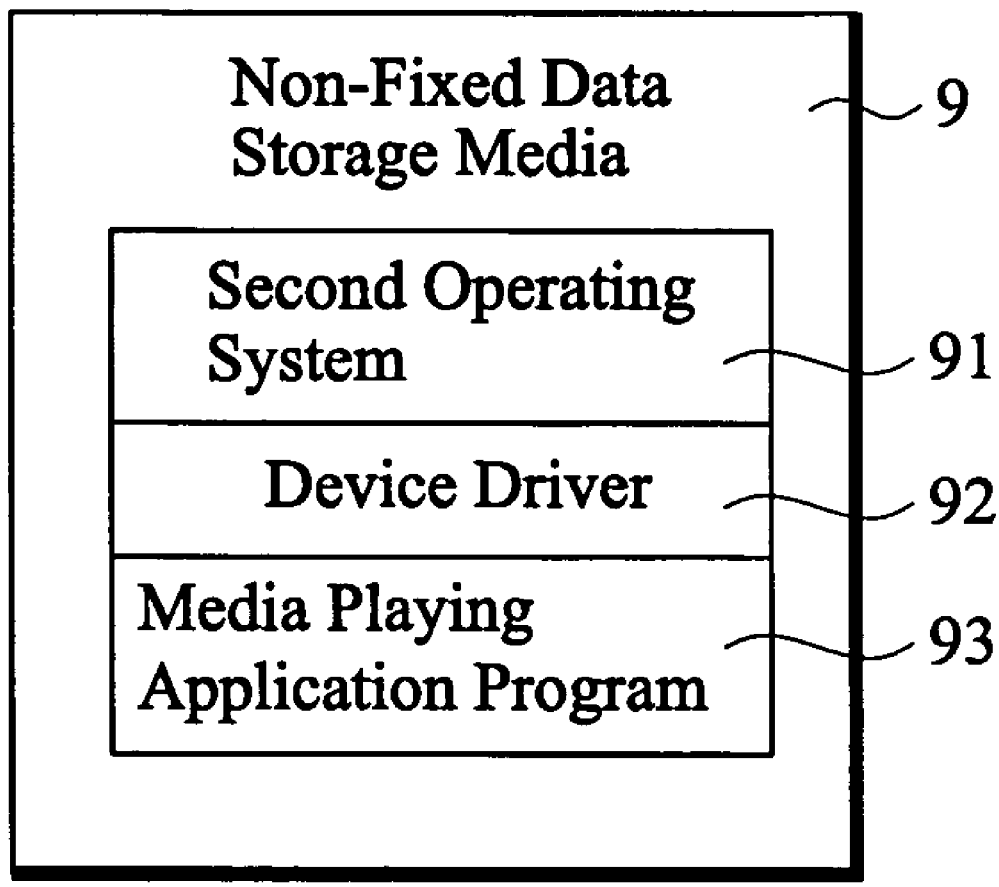
FIG. 3 is a schematic view of a storage media pre-installed with a second operating system, a device driver, and a media playing application program according to the present invention.

The storage media reading device 7 can be for example a compact disc (CD) player. The storage media reading device 7 accesses data stored in a storage media, such as CD or DVD. As shown in FIG. 3 of the attached drawings, a non-fixed data storage media 9 to realize the present invention is pre-installed with a second operating system 91, drivers 92, a media playing application program 93, and other information related to the media players.

The second operating system 91 stored in the non-fixed data storage media 9 can be a Linux-based operating system or other types of operation system, such as Tiny Windows-based operating system, or embedded operating system.

The media player 8 is connected to the computer 100 through the audiovisual interface 80. The audiovisual interface 80 can use a standard peripheral device connection interface to connect the media player 8 to the PCI/ISA bus 12 of the computer 100, so that the computer 100 can control or transmit data to the media player 8 through the audiovisual interface 80.

Figure 4:
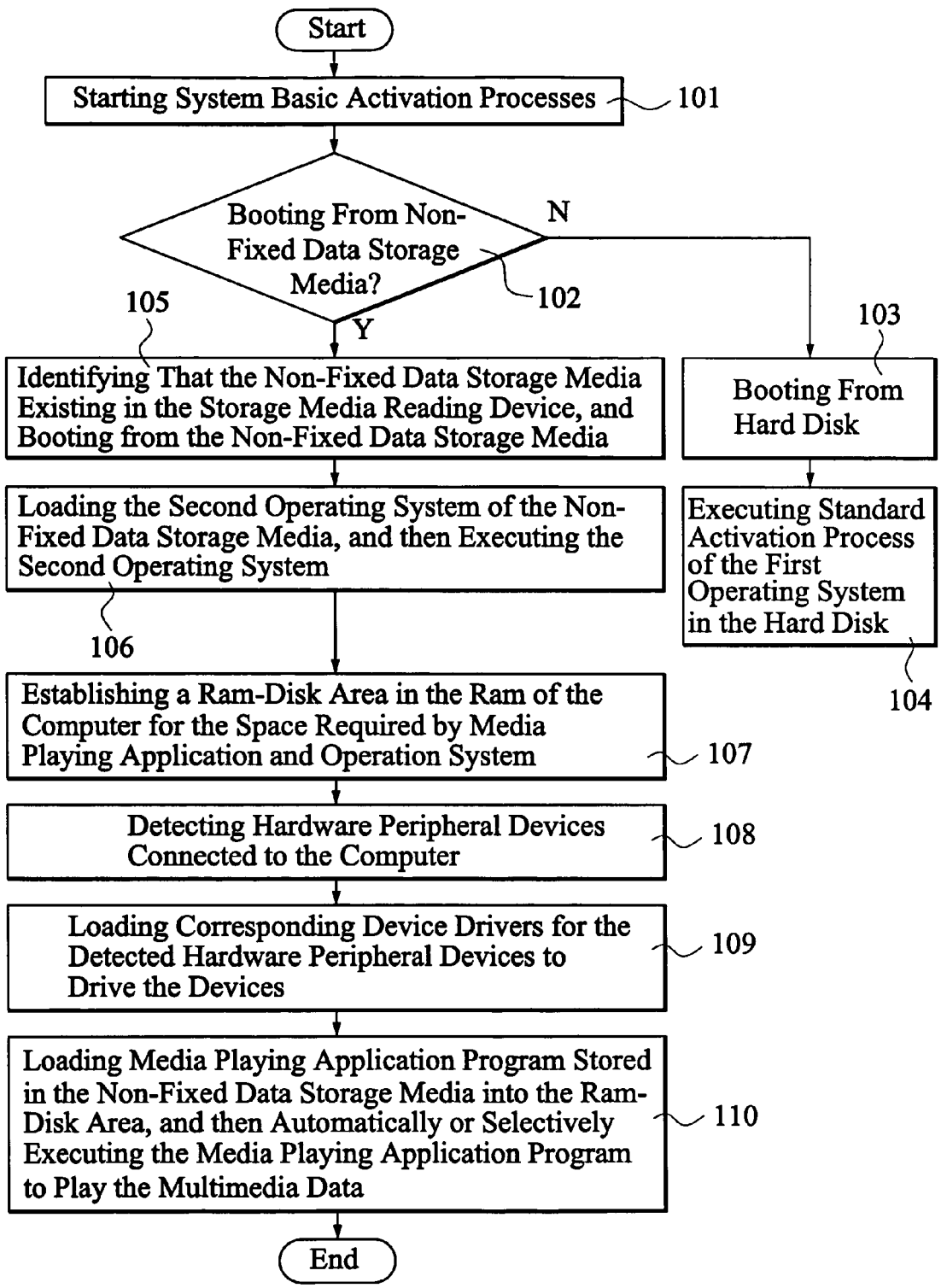
FIG. 4 is a control flowchart of the present invention.

FIG. 4 shows a flowchart of the first embodiment of the present invention. The following explanation refers to both FIGS. 4 and 2.

When the computer 100 is activated, the computer 100 starts the system basic activation processes (step 101). At this time, the computer.100 loads the BIOS program 41 and the POST program 42 from BIOS ROM 4.

After the computer 100 finishes the basic activation processes, the computer 100 executes step 102 to determine whether the computer 100 is activated/booted from the non-fixed data storage media 9 or activated by the hard disk 6.

This activation determination step is usually controlled by the BIOS function table of the computer 100. For example, the user sets the storage media reading device 7 as the first priority activation device and the hard disk 6 as the second priority activation device in the BIOS function table. When the computer 100 is activated, if no non-fixed data storage media 9 is detected in the storage media reading device 7, the computer 100 chooses the hard disk 6 as the activation device (step 103), and executes the standard activation process of the first operating system 61 in the hard disk 6 (step 104).

On the other hand, if the computer 100 detects and identifies that the non-fixed data storage media 9 existing in the storage media reading device 7, the computer 100 uses the non-fixed data storage media 9 for activation (step 105).

In step 102, a selection menu can be shown on the monitor 3 of the computer 100. The selection menu includes options such as selecting the first operating system 61 of the hard disk 6 for activation or the second operating system 91 of the non-fixed data storage media 9 for activation. The user can choose, based on the need, either the first operating system 61 of the hard disk 6 for windows operation and applications or the second operating system 91 of the non-fixed data storage media 9 for fast activation and playing of multimedia data.

In step 105, the computer 100 loads the second operating system 91 of the non-fixed data storage media 9 into the RAM 2 of the computer 100, and then starts executing the second operating system 91 (step 106). The computer 100 can use the conventional RAM-DISK technology to establish a RAM-DISK area 21 (step 107) in the RAM 2 of the computer for the space required by applications and operation system.

After step 107, the computer 100 starts to detect all the hardware peripheral devices connected to the computer 100 (step 108) and loads corresponding device drivers 92 for the detected hardware peripheral devices (step 109) to drive the devices. The related hardware peripheral devices include media player 8 and related audiovisual devices. The device driver 92 for the media player 8 can be stored in the non-fixed data storage media 9 or in the hard disk 6.

After finishing driving al the hardware peripheral devices, the computer 100 loads media playing application program 93 stored in the non-fixed data storage media 9 into the RAM-DISK area 21 of the RAM 2 established in step 107. Step 110 is to automatically execute the media playing application program. At this time, the user does not require to enter the first operating system 61 of the computer 100, and does not require the hard disk 6 of the computer 100 for playing multimedia data.

In step 110, the automatic execution of the playing can also be designed as for the user to select the playing. This flexibility is especially useful when more than one application programs can be used for playing.

In summary, the present invention of a method for fast activation and playing of multimedia data with a non-fixed data storage media can achieve the above mentioned objectives. While the invention has been described in connection with what is presently considered to the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. A method of playing multimedia data with a computer comprising a BIOS program, a hard disk installed with a first operating system, a RAM, a storage media reading device, and an audiovisual interface, the method comprising steps of:
   (a) energizing the computer where the storage media reading device is set as a first priority activation device in the BIOS program;
   (b) providing a non-fixed data storage media having a second operating system, device drivers and a media playing application program stored thereon;
   (c) detecting whether the non-fixed data storage media is present in the storage media reading device, upon failing to detect the non-fixed data storage media, then loading and executing the first operating system from the hard drive, or upon detecting the non-fixed data storage media proceeding to step (d);
   (d) loading the stored second operating system from the non-fixed data storage media into the computer and executing the second operating system;
   (e) detecting a multimedia player device being connected to the audiovisual interface of the computer, and responsive to the detection of the multimedia player device loading and then executing a corresponding device driver from the non-fixed data storage media for activating the multimedia player device;
   (f) responsive to execution of the corresponding device driver then executing the stored media playing application program from the non-fixed data storage media; and
   (g) playing the multimedia data through the audiovisual interface of the computer.

2. The method as claimed in claim 1, wherein the storage media reading device is a compact disk player, and the non-fixed data storage media is a compact disk.

3. The method as claimed in claim 1, wherein step (d) further comprises a step of establishing a RAM-DISK area in the RAM of the computer for providing space required for executing the second operating system, the corresponding device driver and the media playing application program.

4. A method of playing multimedia data with a computer comprising a BIOS program, a hard disk installed with a first operating system, a RAM, a storage media reading device, and an audiovisual interface, the storage media reading device having a non-fixed data storage media, the non-fixed data storage media having a second operating system and a media playing application program stored thereon, the method comprising steps of:
   (a) energizing the computer the hard disk, the RAM, the storage media reading device, and the audiovisual interface connected thereto;
   (b) displaying a selection menu on a monitor connected to the computer, the selection menu including options of selecting the first operating system of the hard disk or the second operating system of the non-fixed data storage media for activating the computer;
   (c) loading and executing the stored second operating system from the non-fixed data storage media in the storage media reading device into the computer responsive to the second operating system having been selected from the selection menu;
   (d) detecting a media player device being connected to the audiovisual interface of the computer, and executing a corresponding device driver for activating the media player device responsive to the detection of the media player device;
   (e) executing the stored media playing application program from the non-fixed data storage media; and
   (f) playing the multimedia data through the audiovisual interface of the computer.

5. The method as claimed in claim 4, wherein the storage media reading device is a compact disk player, and the non-fixed data storage media is a compact disk.

6. The method as claimed in claim 4, wherein step (c) further comprises a step of detecting whether the non-fixed storage media is present in the storage media reading device.

7. The method as claimed in claim 4, wherein step (c) further comprises a step of establishing a RAM-DISK area in the RAM of the computer for providing space required for executing the second operating system, the corresponding device driver and the media playing application program.

8. The method as claimed in claim 4, wherein the corresponding device driver for the media player device of step (d) is pre-installed in the storage media.

* * * * *